United States Patent
Messmann

(10) Patent No.: US 6,453,728 B2
(45) Date of Patent: Sep. 24, 2002

(54) METHOD AND APPARATUS FOR TESTING HOLLOW PIECES FOR IMPERMEABILITY

(75) Inventor: Martin Messmann, Papenburg (DE)

(73) Assignee: Josef Messman GmbH, Papenburg (DE)

(*) Notice: Subject to any disclaimer, the term of this patent is extended or adjusted under 35 U.S.C. 154(b) by 0 days.

(21) Appl. No.: 09/727,685

(22) Filed: Dec. 4, 2000

(30) Foreign Application Priority Data

Dec. 2, 1999 (DE) .......................... 199 57 998

(51) Int. Cl.⁷ ................................. G01M 3/04
(52) U.S. Cl. ..................... 73/40.7; 73/40; 73/49.1
(58) Field of Search .............. 73/40, 40.7, 49.1

(56) References Cited

U.S. PATENT DOCUMENTS

| | | | | |
|---|---|---|---|---|
| 4,984,450 A | * | 1/1991 | Burger | 73/40.7 |
| 5,297,422 A | * | 3/1994 | Baret | 73/40.7 |
| 5,367,797 A | * | 11/1994 | Zaim | 73/37 |
| 5,610,323 A | * | 3/1997 | Ashworth | 73/40.5 R |
| 5,616,854 A | * | 4/1997 | Berg | 285/235 |
| 5,625,141 A | * | 4/1997 | Mahoney et al. | 73/40.7 |
| 6,119,507 A | * | 9/2000 | Flosbach et al. | 73/40.7 |

FOREIGN PATENT DOCUMENTS

| | | | | |
|---|---|---|---|---|
| DE | 43 07 283 | 9/1994 | | |
| JP | 6288856 A | * 10/1994 | | 73/40 |

OTHER PUBLICATIONS

JPO machine assisted translation of JP-06288856-A, detailed description section.*

* cited by examiner

Primary Examiner—Hezron Williams
Assistant Examiner—Michael Cygan
(74) Attorney, Agent, or Firm—Burns, Doane, Swecker & Mathis, LLP

(57) ABSTRACT

The impermeability of a test piece, e.g., a pipe made of concrete, clay, stoneware, etc., is tested using a vacuum. Air in a compensation tank is maintained at a vacuum and also at a temperature that corresponds to the temperature of the inside wall of the test piece. Then, the test piece, sealed on both ends, has a vacuum generated therein that corresponds to the vacuum inside the compensation tank. Subsequently, the air inside the test piece is replaced with the temperature-controlled air from inside the compensation tank, and then the vacuum inside the test piece is adjusted to a predetermined testing level. The progression of the vacuum over a time period in the test piece is monitored. If the measured vacuum drops below a prescribed tolerance limit, the pipe is considered too leaky.

17 Claims, 2 Drawing Sheets

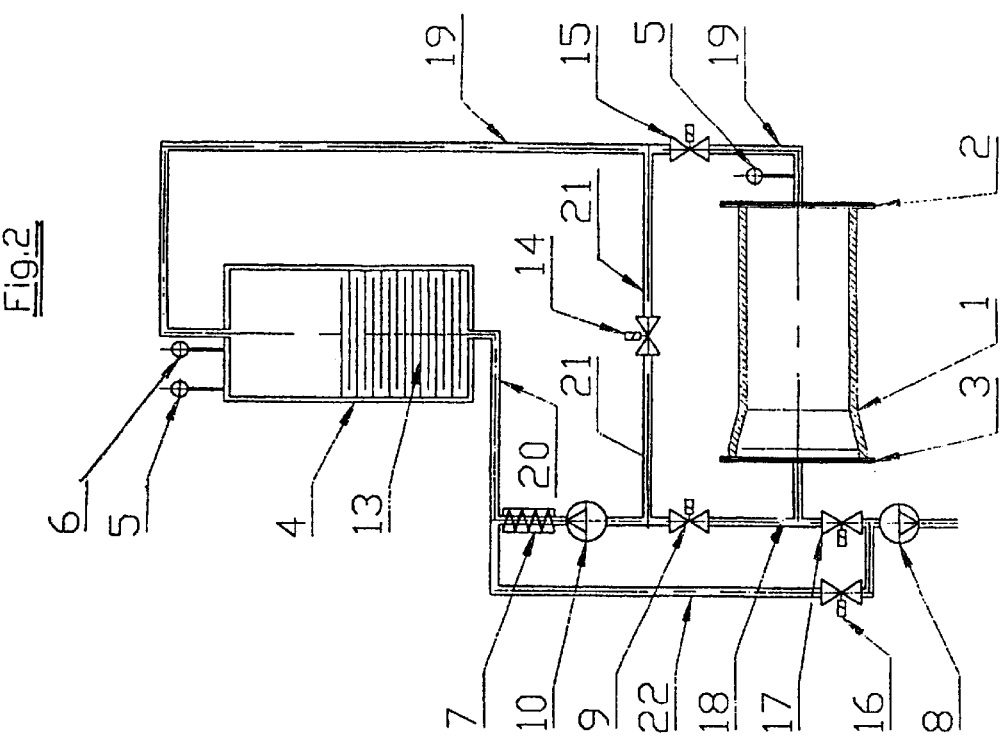
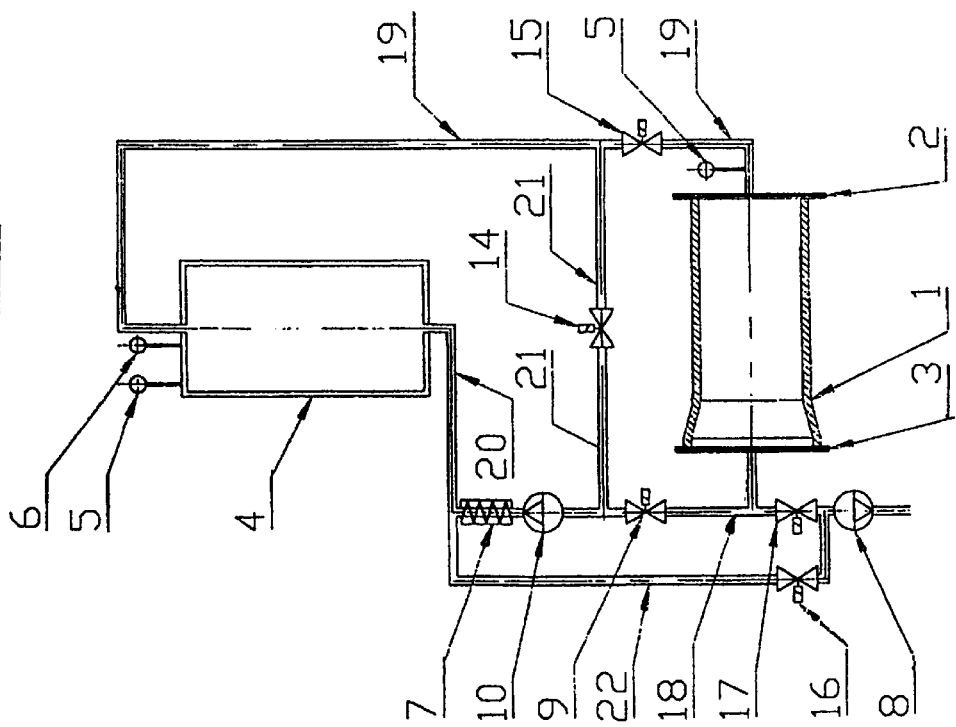

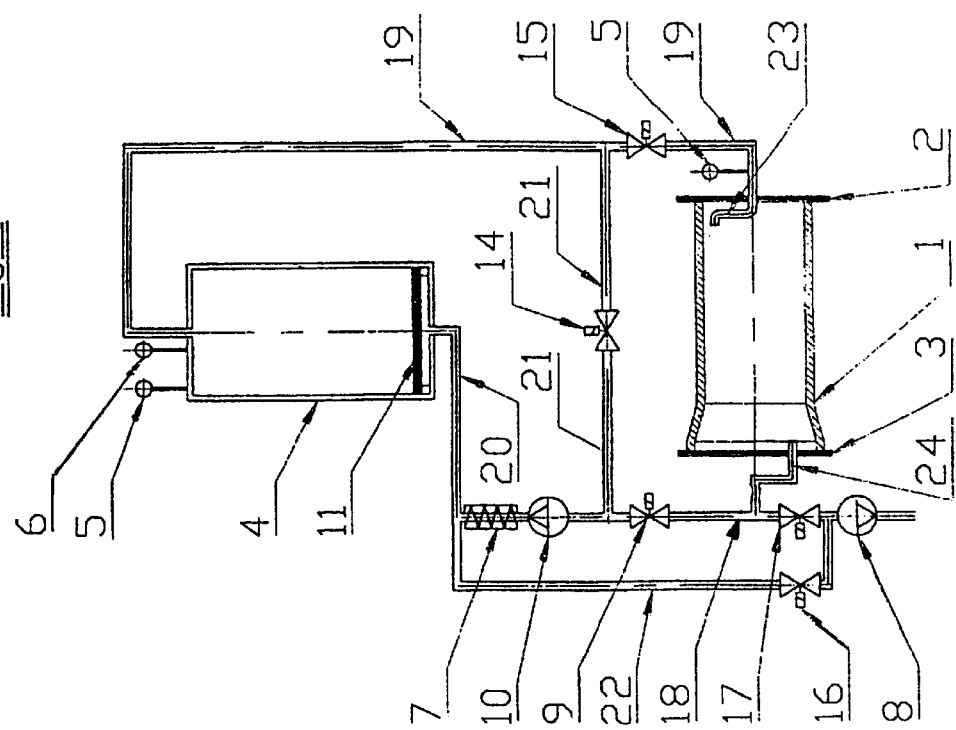
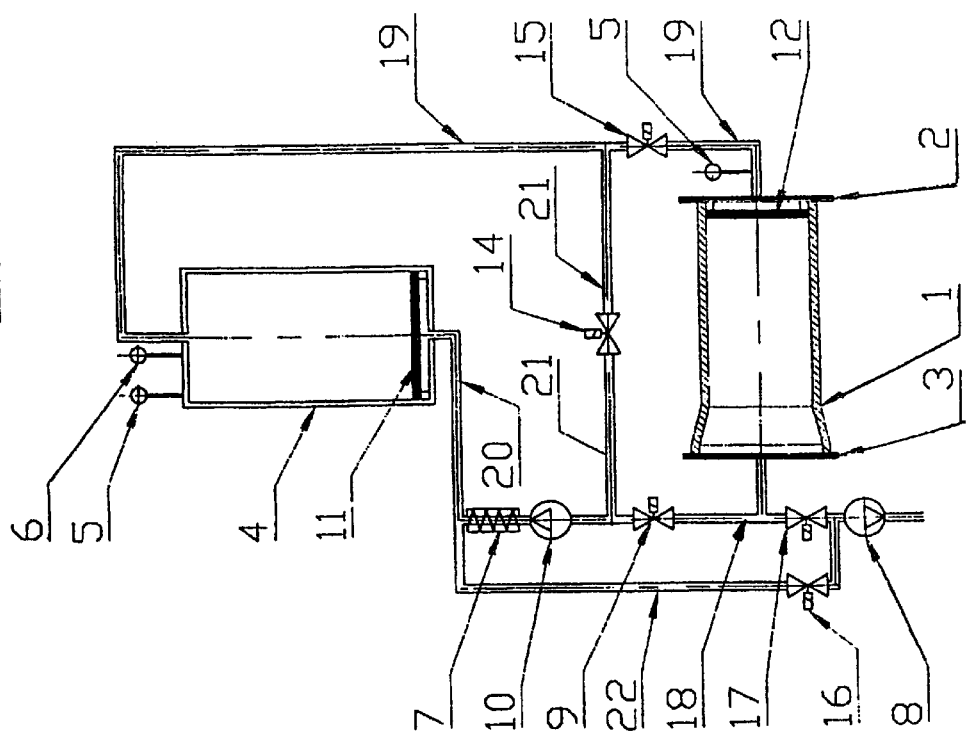

METHOD AND APPARATUS FOR TESTING HOLLOW PIECES FOR IMPERMEABILITY

BACKGROUND OF THE INVENTION

The invention relates to a method for testing hollow pieces, such as pipes, etc., made of concrete, stoneware, casting, etc, in terms of their impermeability using a vacuum testing apparatus. Also, the invention relates to an apparatus for implementing the method, consisting of a support for the test piece and a medium for sealing the test piece on both sides. In particular, one of the sealing media is connected with a vacuum pump as well as with instruments for measuring the negative pressure.

The invention relies on known testing procedures for pipes made of stoneware, clay, concrete or similar porous materials. These procedures provide that both ends of the pipe are closed off with testing plates equipped with seals. If a negative pressure is created inside the test piece, that is sealed off on both sides, using the connected vacuum pump, it is possible to draw conclusions as to the grade of impermeability of the test piece based on the vacuum drop after the suction has been turned off. These conclusions are unreliable, however, if the internal pressure inside the test piece changes due to temperature variations after the suction is discontinued. Therefore, conducting a useful measurement is only possible once a stationary equilibrium with regard to the temperature has been reached.

Using methods of this kind is particularly disadvantageous in instances of fixed-cycle manufacturing because the required waiting time period for achieving the temperature equilibrium is too long. This time period is extended in particular by the thermal energy that is used for the adiabatic relaxation of the air while the vacuum is drawn. Another delay is caused by the evaporation of the water remaining in the pores which causes a cooling of the (rest) air content inside the test piece whereby a drop in pressure occurs which simulates an impermeability that does not in fact exist.

OBJECTS AND SUMMARY OF THE INVENTION

It is an object of the present invention to provide a class-specific method that accelerates the achieving of the temperature equilibrium, to reduce the testing time in fixed-cycle manufacturing; in addition, it is an object of the present invention to provide a class-specific apparatus for implementing the method that allows safe and undisturbed vacuum testing even in connection with short fixed-cycle times.

According to the invention this objective is achieved by a method for testing hollow test pieces for impermeability. The method comprises the steps of:

A) providing a gas in a vacuum in a compensation tank;
B) heating the gas provided in step A with a heater to a temperature substantially corresponding to a temperature of an inside wall of a test piece, whereby such gas constitutes temperature-controlled gas;
C) providing a gas at a vacuum in the test piece, which vacuum is at a level substantially corresponding to a value of the vacuum of the temperature-controlled gas in the compensation tank;
D) replacing the gas in the test piece with the temperature-controlled gas from the compensation tank;
E) adjusting the vacuum of the temperature-controlled gas supplied to the test piece in step D to a predetermined level; and
F) monitoring the vacuum level of the temperature-controlled gas in the test piece subsequent to step E for a predetermined period.

The invention also relates to an apparatus for testing hollow test pieces for impermeability. The apparatus includes a support for supporting a test piece, and two end plates for sealing opposite ends of the test piece. A compensation tank and a vacuum pump are provided. A first conduit arrangement is provided for selectively connecting the vacuum pump with one of the end plates and the compensation tank for providing gas at a vacuum selectively in the compensation tank and a test piece. A second conduit arrangement is provided for connecting the compensation tank with one of the end plates for replacing gas in the test piece with gas from the compensation tank. A first pressure measuring device measures pressure of gas in the compensation tank. A temperature measuring device measures temperature of gas in the compensation tank. A second pressure measuring device measures pressure of gas in the test piece.

For the testing process a vacuum is created inside the compensation tank, and the gas (preferably air) that is inside the tank is maintained at a temperature that corresponds essentially to the temperature of the interior wall of the test piece. The test piece, sealed at both ends, is inserted into the vacuum testing apparatus and connected to the compensation tank. Using isolating valves, at least one of the pipes in the circuit is closed off first. Subsequently, by means of the connected vacuum pump a vacuum that corresponds to the vacuum in the compensation tank is generated inside the test piece. During this time the connection between test piece and compensation tank remains closed at least on the one side in order to prevent any exchange of air from occurring. The air inside the test piece is then replaced with the temperature-controlled air from inside the compensation tank after a vacuum has been achieved in the test piece which substantially corresponds to the vacuum in the compensation tank. The colder air inside the test piece is transported into the compensation tank during this process, causing the warmer air that is present in the compensation tank to be displaced and transferred into the test piece. After the volume exchange has been completed, the connection between the test piece and the compensation tank is shut off once again. Now the temperature of the air inside the test piece corresponds in good approximation to the wall temperature, which is why a thermal equilibrium has now been achieved. The vacuum in the test piece is brought to match the measuring vacuum, and the progression of the vacuum level is monitored over a certain measuring period. If the vacuum losses exceed prescribed tolerance limits, the pipe is considered to be leaky and is separated from the rest.

After the examination is complete a new test piece is inserted into the vacuum testing apparatus; during this step the connection between the test piece and the equilibrium volume stays turned off. Only after this test piece has also been brought to match the vacuum are the two air volumes exchanged in accordance with the way described above.

It is advantageous to employ a heating device in order to keep the temperature of the air volume that is inside the compensation tank at the same temperature as the inside wall of the test piece. In this context it is also advantageous if a control unit triggers the heating device. This kind of adjustment utilizes the measured wall temperature as a command variable. Due to the fact that the thermal inertia precludes quick temperature changes in fixed-cycle tests it is sufficient if the temperature of the inside wall of the subsequent pipe, i.e. which is to be tested next, is used as that command variable. Also, it is advantageous to envision a heat-up circuit that can be shut off with a bypass valve and in which the air from the compensation tank circulates during the time it takes to exchange test pieces. The heating device is integrated into this circuit. The heat-up circuit is wired parallel to the test piece.

During the air exchange it is crucial that any mixing of air be suppressed; consequently, the air is introduced into the test piece and/or into the compensation tank essentially without vibration. According to a further development of the invention the air that is to be exchanged flows from the compensation tank into the test piece, in particular it enters the test piece in the area of the upper pipe crown. The flow exits in the area of the lower pipe crown. In the alternative, the transfer flow of air from the compensation tank into the test piece enters the latter as an essentially quasi-steady or turbulence-poor displacement flow. It is advantageous to envision these flows also with respect to the compensation tank.

Monitoring the progression over time of the vacuum can begin now. The cooled air from the test piece, which was transported into the compensation tank, can now adjust itself or can be adjusted to match the temperature during the length of time of the total duration of the testing cycle that is not needed for the exchange of the air volumes, thereby making that air available for the air exchange that will take place during a subsequent testing cycle.

The vacuum testing device itself is known in the art, for instance, from DE 43 07 283.6-09, the disclosure of which is incorporated by reference herein. It features a support onto which the test piece is placed in a flat (or standing) position. This test piece is scaled on both sides; in particular, front or end plates pressed against the open pipe ends are envisioned for this step. One of the front plates is connected with a vacuum pump which is used to create a certain vacuum inside the test piece. A manometer is used for measuring the vacuum and for monitoring the vacuum with respect to any pressure changes. These changes become noticeable because air seeps in to the pipe through the porosity [in the wall] and causes a reduction of the vacuum in relation to the outside pressure.

To eliminate the impact of pressure changes due to temperature the test piece is allocated a compensation tank which is connected to the test piece on both sides via conduits that are equipped with isolating valves. Test piece, compensation tank and conduits form a single, closed air circulation system. Pressure and temperature are monitored at least inside the compensation tank; for this purpose the compensation tank has a pressure measuring device and/or a temperature measuring device. The vacuum pump is connected to one of the conduits rendering a separate implementation for the vacuum connection piece unnecessary. An isolation valve is to be positioned at least in one of the conduits. It is advantageous if each of the two conduits has an isolation valve. To be able to adjust the inside pressures of the compensation tank and of the test piece independently of each other, a conduit with an isolation valve is to be positioned between the connection point of the vacuum pump and the compensation tank. In order to exchange the cooled air of the test piece with the re-heated air inside the compensation tank it is advantageous if the test piece and the compensation tank are arranged via connecting lines within a circulation system. It is advantageous to provide a circulating blower in the context of the pipes that form the circulation system for the purpose of transporting the air inside the system and for accelerating the air exchange.

In order to maintain the temperature a heating device is to be placed inside the compensation tank or within the context of the pipes forming the circulation system. To be able to run an air circulation even independent of a positioned test piece, an advantageous further development of the invention envisions a bypass system or heat-up system with a bypass valve. This way it is possible to achieve the necessary temperature in the compensation tank including in the line components for the impermeability determinations even before the start-up of the vacuum testing apparatus.

If the test pieces are coming from an assembly line that is equipped with heating chambers with higher temperatures, the conditions can become reversed: In particular, the air flowing from the compensation tank toward the test piece must be heated to a higher temperature. If the temperature of wall of the compensation tank does not at all or only insufficiently correspond to that of the test piece, it is advantageous to apply thermal insulation on the inside of the compensation tank wall. This eliminates the heat capacity of the walls of the compensation tank. The energy that is required for re-heating is, in this case, generated entirely or in part by the heating device that is arranged in the short circuit.

To suppress the possibility of any mixing of the air that flows into the compensation tank or into the test piece with the air that is already present in the compensation tank or in the test piece air distribution devices or flow rectifiers are envisioned in the flow entry areas of the test piece and/or of the compensation tank whose purpose consists in ensuring a laminar air flow into the test piece and/or into the compensation tank. These measures allow the smooth introduction of air and consequently improve the air exchange. Suitable for use as air distribution devices or as flow rectifiers of this kind are coaxial air admission devices known from the field of air conditioning technology; other devices serving this purpose are distribution grids or piles of screens, fabric or felt disks that cover up the cross section of the flow entry area. In the alternative, it is also possible to envision flow obstacles that force the in-flowing air "to push" the out-flowing air "ahead" on its way inside.

The exchange of air always involves air of different temperatures. It's therefore advantageous to provide the entry point for the warmer air into the test piece in the upper pipe crown area while the colder air exits in the lower pipe crown area, thereby taking advantage of the differences in density of wanner and colder air. Any mixing of inflowing colder air with wanner air that is already present inside the compensation tank should be avoided. Thus, it is advantageous to place the compensation tank in an uptight position with the in-flow line attached at the bottom and the circulation line leading to the test piece attached at the top of the tank. In an advantageous embodiment, an air distribution device is arranged in the compensation tank, in particular in the area of the in-flowing colder air, thereby forcing as much as possible a laminar flow directed at the opposite side. In an advantageous embodiment using separating walls air that is on its way into and/or through the compensation tank is forced into a channel which has a smaller cross section intended to reduce the size of the mixing front.

In an advantageous further development the air has the temperature of the inside wall of the test piece or it is brought to that temperature when the air is transferred from the compensation tank into the test piece. A heating device is envisioned for this purpose which is located in the compensation tank or in the conduit running from the test piece to the compensation tank. The heating device is advantageously activated by way of a temperature control or temperature adjuster whose command variable is the wall temperature taken from the inside wall of the test piece.

Instead of the temperature of the inside wall of the test piece itself it is also possible to take the inside wall temperature of the subsequent pipe which will be placed into the vacuum testing apparatus next. The considerable heat capacity of the wall and the related heat inertia associated with it allows proceeding in this manner. The advantage of this alternative consists in the fact that the measuring site is more easily accessible. The adjustment is controlled by the inside wall temperature as command variable; the heating device is operated by the actuator of this control circuit, thereby ensuring an optimal temperature adjustment.

During the actual testing, i.e. in the time interval during which the vacuum is measured inside the test piece and any changes thereof over time are monitored for the evaluation of the impermeability of the test piece, it is advantageous to shut off the connecting lines between the test piece and the compensation tank. During this step the cycle is stationary; this is the time when the circulation system is available for re-heating the colder air volume that has flown into the compensation tank. For this purpose the compensation tank is advantageously connected with its two air connections, the circulation blower and the heating device via a bypass line in relation to the re-heating circuit, which can be shut off, that accelerates the energy transfer from the wall of the compensation tank to the air. If the compensation tank cools down to an extent that sufficient re-heating of the cooled down air, utilizing the heat capacity of its walls, is no longer ensured after a number of test pieces were examined in fixed cycles, it is necessary and advantageous to integrate a heating device into the secondary reheating circuit that advantageously becomes part of the temperature control. If the walls of the compensation tank have a temperature that does not at all, or only inadequately, correspond to the wall temperature of the test piece, it is advantageous to apply heat insulation on the inside walls of the compensation tank. It is also advantageous in this context if the amount of energy necessary for the re-heating is produced, in this case entirely or in part, by the heating device that is arranged in the secondary re-heating circuit.

Due to the fact that the air that is located inside the compensation tank and in its attached re-heating circuit expands during the re-heating process, which causes the adjusted pressure level to change, it is advantageous to provide a connecting line to the vacuum pump equipped with a shut-off device that can be opened briefly in order to effect a pressure release. In this way, it is possible to adjust the compensation tank and the test piece to the same vacuum level before the actual testing is commenced, and before the connecting lines between compensation tank and test piece are opened.

BRIEF DESCRIPTION OF THE DRAWINGS

The principal aspects of the invention are described in more detail utilizing the embodiments that are illustrated in FIGS. 1 to 4. Shown are:

FIG. 1: Vacuum testing apparatus with test piece and compensation tank and the accompanying instrumentation (schematic depiction):

FIG. 2: Vacuum testing apparatus in accordance with FIG. 1; the compensation tank with forced air guiding devices (schematic depiction);

FIG. 3: Vacuum testing apparatus in accordance with FIG. 1; test piece and compensation tank with flow rectifier in the entry flow area (schematic depiction;

FIG. 4: Vacuum testing apparatus in accordance with FIG. 1; test piece with flow-in at the top and flow-out at the bottom of the test piece (schematic depiction).

DETAILED DESCRIPTION OF PREFERRED EMBODIMENTS OF THE INVENTION

FIG. 1 shows the test piece 1, in particular a concrete pipe, that is clamped between the end plates 2 and 3 for the purpose of an impermeability test. It goes without saying that these end plates 2 and 3 are part of a whole testing construct (which is not shown here in more detail). The testing construct can also be set up to provide for examination of the test pieces 1 at fixed cycles, with the test pieces resting on a transport device and being transported through the testing construct that is designed as a testing station and as a part of the manufacturing process. The front plate 3 can be attached to a vacuum pump 8 via a tab line that is inserted into the connecting line 18. The vacuum pump 8 is suitable for adjusting the desired or required testing pressure inside the test piece 1. After the desired or required vacuum has been reached, a valve 17 is closed, thereby interrupting the connection between test piece 1 and vacuum pump 8. Any permeability in the walls of the test piece now allows gas (e.g., air) to enter the test piece which reduces the vacuum and consequently causes the pressure to rise. A pressure control device permits monitoring this pressure change, if need be also with remote transmission to a control station where a printout of the result can be generated.

A compensation tank 4 is connected to the test piece via the circuit line 19 (containing a circuit valve 15), the circuit line 18, a circuit valve 9, a circulation blower 10, a heating device 7 and a connecting line 20. At the beginning of an examination of several test pieces the compensation tank 4 is initially connected with the vacuum pump 8 via an accessory line 22 and an accessory valve 16, which causes a vacuum to be generated inside the compensation tank 4. The circuit valves 15 and 9 remain closed during this step. Once the desired negative pressure is achieved, the accessory valve 16 is closed. Then the blower 10 and, if need be, the heating device 7 as well as accompanying temperature adjustment and temperature measurement instruments are activated; a bypass valve 14 is opened causing gas (e.g., air) to flow into a bypass line 21. Now the cooled-down air warms up to a temperature corresponding to a temperature of an inside wall of the test piece (i.e., a temperature of the inside wall prior to a vacuum being generated in the test piece).

Thus, equal vacuums can be established independently in the compensation tank 4 and the test piece 1, respectively. Once that has occurred, the circuit valves 9 and 15 are opened (preferably shortly after the bypass valve 14 was closed). Now the circuit blower 10 is activated and transports the air that is present inside the test piece via the circuit line 18 and the connecting line 20 into the compensation tank 4 while simultaneously transporting temperature-controlled air from the compensation tank 4 into the test piece 1 via the circuit line 19. As soon as this process has been completed, the circuit valves 9 and 15 are closed, resulting in the test piece remaining at the vacuum at thermal equilibrium. Now the test piece is evaluated using measuring technology that is known in the art. Once the circuit valves 9 and 15 have been closed, the bypass valve 14 can be reopened in order to re-close the re-heating circuit for the compensation tank 4. When the evaluation of the test piece 1 has been completed, the vacuum is eliminated by activating a ventilation valve (not shown here), and the two front plates 2 and 3 are removed. Now a new test piece 1 can be inserted into the vacuum testing apparatus.

Temperature measuring instruments 6 and pressure measuring instruments 5 determine temperature and pressure of the air inside the compensation tank 4 and/or inside the test piece 1. The installation for measuring the temperature of the inside wall of the pipe and/or the ambient temperature is not shown. This device is envisioned, for example with regard to the inside wall temperature of the test piece, on the end plates as temperature gauges that adhere with spring-like properties against the inside wall of the test piece. If the temperature of the subsequent pipe is used for the testing cycle, the temperature gauge is fitted closely against that pipe's inside wall. These measured values are transmitted as desired values to the temperature control of the heating device in the circuit and/or in the compensation tank.

A modified form of the compensation tank 4 is shown in FIG. 2 wherein flow inserts 13 are provided in the compensation tank 4, in particular in the flow entry area of the compensation tank 4. The flow inserts forcibly guide the air entering the compensation tank in a manner limiting any mixing of the entering and exiting air masses.

Alternatively, the danger of mixing the air masses could be reduced by providing a conventional flow rectifier 12 in the test piece 1 and/or a flow rectifier 11 in the compensation tank 4, as illustrated in FIG. 3. The flow rectifiers 11, 12 shown here could be for example, in the form of felt disks. The rectifiers tend to minimize turbulence, i.e., the air flow that exits from the rectifiers is basically laminar. If this laminar flow is maintained along the entire length of the test piece (or the compensation tank), the result is a flow type known as a turbulence-poor displacement flow which suppresses the mixing phenomena.

Finally, FIG. 4 shows a variation in which the warmer air is introduced at the upper crown of one end of the test piece, and the cooled-down air exits from the lower crown of the pipe at the opposite end of the test piece. To accomplish this, both front pieces 2 and 3 of the test piece 1 are equipped with connection pieces 23 and 24 that are bent in a Z-shape and whose open connection ends in the areas respectively at the upper and lower crowns are aligned parallel to the center axis of the test. Accordingly, the entry flow in the upper pipe area and also the sucking of air from the lower pipe area are possible in a direction parallel to the axis. In this instance the compensation tank 4 is equipped with a flow rectifier 11, allowing for a simple flow that suppresses mixing for the most part.

Although the present invention has been described in connection with preferred embodiments of the invention, it will be appreciated by those skilled in the art that additions, modifications, substitutions and deletions not specifically described may be made without departing from the spirit and scope of the invention as defined in the appended claims.

What is claimed is:

1. Method for testing hollow test pieces for impermeability, comprising the steps of:
   A) providing a gas at a vacuum in a compensation tank;
   B) heating the gas provided in step A with a heater to a temperature substantially corresponding to a temperature of an inside wall of a test piece, whereby such gas constitutes temperature-controlled gas;
   C) providing a gas at a vacuum in the test piece, which vacuum is at a level substantially corresponding to a value of the vacuum of the temperature-controlled gas in the compensation tank;
   D) replacing the gas in the test piece with the temperature-controlled gas from the compensation tank;
   E) adjusting the vacuum of the temperature-controlled gas supplied to the test piece in step D to a predetermined level; and
   F) monitoring the vacuum level of the temperature-controlled gas in the test piece subsequent to step E for a predetermined period.

2. The method according to claim 1 wherein the gas provided in each of steps A and C comprises air.

3. The method according to claim 1 wherein step B further comprises measuring the temperature of the inside wall and automatically controlling actuation of the heater in response to the measured temperature of the inside wall.

4. The method according to claim 1 wherein step D further comprises introducing the temperature-controlled gas at an upper portion of one end region of the test piece while evacuating gas from the test piece at a lower portion of an opposite end region of the test piece.

5. The method according to claim 1 wherein step D further comprises causing the temperature-controlled gas to flow into the test piece in a turbulence-poor flow.

6. The method according to claim 1 wherein step D comprises introducing gas from the test piece into a lower portion of the compensation tank while simultaneously discharging temperature-controlled gas from an upper portion of the compensation tank.

7. The method according to claim 1 wherein step D further comprises introducing gas from the test piece into the compensation tank as a low vibration flow.

8. The method according to claim 1 wherein step D further comprises introducing gas from the test piece into the compensation tank as a turbulence-poor flow.

9. The method according to claim 8 wherein gas flows through the compensation tank as a turbulence-poor flow.

10. Apparatus for testing hollow test pieces for impermeability comprising:
    a support for supporting a test piece;
    two end plates for sealing opposite ends of the test piece;
    a compensation tank;
    a vacuum pump;
    a first conduit arrangement for selectively connecting the vacuum pump with one of the end plates and the compensation tank for providing gas at a vacuum selectively in the compensation tank and a test piece; and
    a second conduit arrangement for connecting the compensation tank with one of the end plates for replacing gas in the test piece with gas from the compensation tank;
    a first pressure measuring device for measuring pressure of gas in the compensation tank;
    a heater disposed in the second conduit arrangement for heating the gas in the compensation tank;
    a temperature measuring device for measuring temperature of gas in the compensation tank; and
    a second pressure measuring device for measuring pressure of gas in the test piece.

11. Apparatus according to claim 10, wherein one of the end plates includes a gas supply pipe for supplying gas at an upper portion of the one end plate, and the other of the end plates includes a gas discharge pipe for discharging gas from a lower portion of the other end plate.

12. Apparatus according to claim 10 further including an air blower for circulating gas in the first and second conduit arrangements.

13. Apparatus according to claim 10 wherein the second conduit arrangement including a valve for communicating gas in the compensation tank selectively with the heater and the one end plate to which the second conduit arrangement is connected.

14. Apparatus according to claim 10 wherein the second conduit arrangement comprises a conduit leading from the first end plate to the compensation tank and including a shut-off valve therein.

15. Apparatus according to claim 10 wherein a flow rectifier is disposed in a gas-entry end of the test piece.

16. Apparatus according to claim 15 wherein the flow rectifier comprises a porous disk.

17. Apparatus according to claim 10 wherein flow obstacles are disposed in a gas entry-end of the compensation tank.

\* \* \* \* \*